(No Model.)
J. R. McALISTER.
HOLDBACK FOR VEHICLES.
No. 406,936. Patented July 16, 1889.
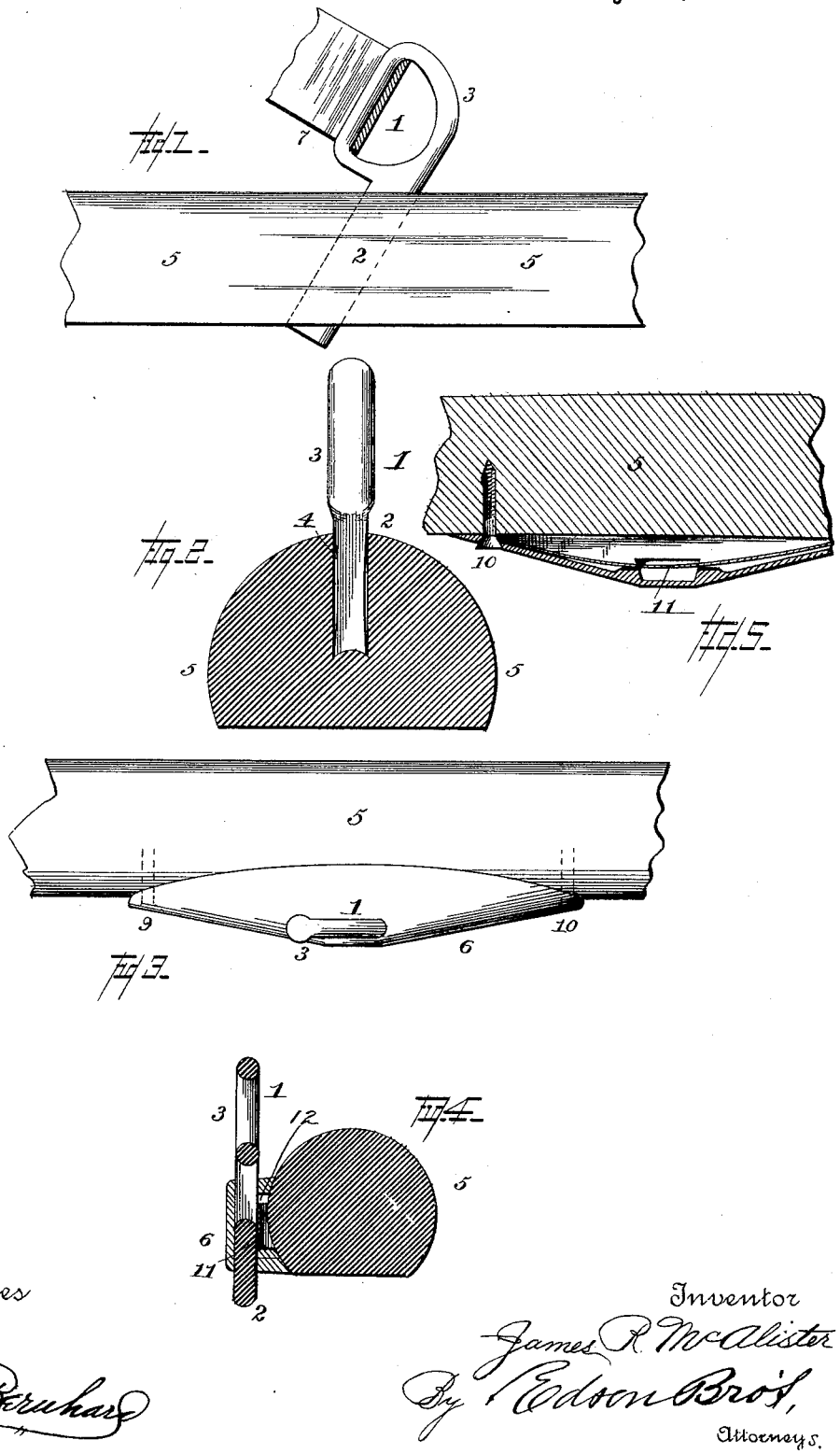
Witnesses
E. H. Berry
H. Bernhard
Inventor
James R. McAlister
By Edson Bro's,
Attorneys.

UNITED STATES PATENT OFFICE.

JAMES R. McALISTER, OF ROSSIE, NEW YORK.

HOLDBACK FOR VEHICLES.

SPECIFICATION forming part of Letters Patent No. 406,936, dated July 16, 1889.

Application filed January 5, 1889. Serial No. 295,531. (No model.)

*To all whom it may concern:*

Be it known that I, JAMES R. McALISTER, a citizen of the United States, and a resident of Rossie, in the county of St. Lawrence and State of New York, have invented certain new and useful Improvements in Holdbacks for Vehicles; and I do hereby declare the following to be a full, clear, and exact description of the invention, such as will enable others skilled in the art to which it appertains to make and use the same.

My invention relates to holdbacks for vehicles; and it consists of the peculiar construction and arrangement of parts, as will be hereinafter fully described and claimed.

The object of my invention is to provide a holdback for vehicles which in use remains attached to the harness and can be easily and expeditiously attached to or detached from the thill of a vehicle, whereby the time and annoyance of attaching the holdback-strap to the iron on the thill are obviated and the animal more quickly and readily attached to or detached from the thills.

With this end in view my invention contemplates a holdback-iron formed of a single piece of metal and having an eye for the reception of the holdback-strap of the harness, and an extended stem or shank which is inserted in a diagonal mortise formed in the thill.

My invention also contemplates the combition, with a holdback-iron having an extended shank, of a metallic plate attached to the thill at one side thereof and having a vertically-inclined or diagonal socket in which said stem or shank is detachably fitted.

My invention further contemplates the combination of a holdback-iron, a fixed slotted plate, and a spring arranged in the slot in the path of said holdback-iron to bear against one of the lateral faces thereof, said spring being housed within a recess in said plate and held in place thereby, all as will be hereinafter more fully described.

To enable others to understand my invention, I will now proceed to describe the same in connection with the accompanying drawings, in which—

Figure 1 is a side elevation of a vehicle-thill, showing my improved holdback applied thereto. Fig. 2 is an enlarged vertical sectional view through a thill, showing my invention applied thereto. Fig. 3 is a plan view of another form of my invention. Fig. 4 is a vertical transverse sectional view taken through the device shown in Fig. 3. Fig. 5 is a horizontal longitudinal sectional view through the device shown in Figs. 3 and 4.

Referring to the drawings, in which like numerals of reference denote corresponding parts in all the figures, 1 designates the holdback-iron of my invention, which is made of metal, and consists of a straight shank or stem 2 and an eye or loop 3, formed integral with the shank at one end thereof. This shank is made rectangular in cross-section, and when in use it fits snugly in a vertically-inclined slot or diagonal mortise 4, which in Figs. 1 and 2 I have shown made directly in the thill 5, or it may be made in a metallic plate 6, as shown in Figs. 3 and 4.

To the eye of this holdback-iron is attached the holdback-strap 7 (see Fig. 1) of a set of harness, and in the practical use of my invention this iron remains attached to the holdback-strap and is adapted to be detachably connected to the thill, which is the reverse of the ordinary method at present in vogue of hitching the animal to the thills, in which the iron remains permanently fixed to the thill and the holdback-strap is connected to the iron each time the horse is hitched to the vehicle.

The shank or stem of the iron 1 fits snugly in the diagonal mortise or slot, and, owing to the inclination of the slot and the frictional contact of the stem with the sides of said slot, the iron 1 is securely held in place and is not liable to become detached when the shaft or thill is supported in its horizonal position by the thill-loops of the harness; but when the animal is unhitched and the thills are dropped the holdback-iron is withdrawn from the diagonal slot or mortise without any attention on the part of the attendant and remains attached to the holdback-strap to be reinserted in said slot or mortise when the animal is again hitched to the vehicle. By this method the animal can be more expeditiously hitched to or unhitched from the thills than by the common practice at present in use.

In lieu of making the slot in the thill itself, owing to the liability of weakening the same, I may provide a metallic plate or bracket 6. (Shown in Figs. 3 and 4.) This plate is made quite thick at its middle to permit the diagonal slot or mortise 4 to be made therein, and the plate is reduced or tapered toward its ends, where it is provided with transverse apertures 9, through which screws 10 or other suitable fastenings are passed to firmly secure said plate 1 to one of the lateral faces of the thill at an intermediate point of the length of the latter suitable for attaching the holdback strap and iron to said thill. To more effectively hold said holdback-iron in place, I contemplate the use of a spring 11, which is arranged in the mortise or slot at one side thereof, and in the path of the stem or shank 2 of the holdback-iron, to bear against one of the lateral faces thereof with a constant pressure, and thus hold said iron securely in place by frictional contact therewith. This spring I preferably make of the "leaf-spring" class, and I arrange it within a suitable recess 12, which is formed in the inner face of the plate that bears against the thill, the middle of the spring forming one side of the diagonal mortise or slot, so as to bear against the stem of the holdback-iron. The spring is thus effectually concealed from view and protected from injury, and it cannot become displaced or broken.

The operation of my invention is obvious from the foregoing description, taken in connection with the drawings.

I would have it understood that I reserve the right to make such changes and alterations in the details of construction and form and proportion of parts as fairly fall within the spirit of my invention.

Having thus fully described my invention, what I claim as new, and desire to secure by Letters Patent, is—

1. In a holdback for vehicles, the combination of a holdback-iron having an eye and an extended shank, and a thill having a vertically-inclined slot formed transversely in a diagonal direction across the length of the thill, and in which the shank is snugly fitted, substantially as and for the purpose described.

2. In a holdback for vehicles, the combination of a thill, a plate fixed laterally thereto and having a vertically-inclined slot formed transversely therein in a diagonal direction across its length, and a holdback-iron having an eye for the attachment of a strap and an extended shank adapted to be fitted in said diagonal slot, substantially as described.

3. In a holdback for vehicles, the combination of a plate fixed laterally to a thill and having a longitudinal recess and a transverse diagonal slot, a spring housed in said recess and arranged across the slot at one side thereof, and a holdback-iron fitted in said slot in position for the spring to impinge against one of the lateral faces thereof, substantially as and for the purpose described.

In testimony whereof I affix my signature in presence of two witnesses.

JAMES R. McALISTER.

Witnesses:
W. T. LORIN,
W. W. LEONARD.